(12) United States Patent
Eslami et al.

(10) Patent No.: US 10,689,898 B2
(45) Date of Patent: Jun. 23, 2020

(54) INTERNET-BASED REMOTE CONTROL AND MONITORING SYSTEM FOR COMMERCIAL DOORS USING MOBILE DEVICES

(71) Applicant: Wichita State University, Wichita, KS (US)

(72) Inventors: Ali Eslami, Wichita, KS (US); Abu Asaduzzaman, Wichita, KS (US); Mohammad Hossein Erjaei, Wichita, KS (US)

(73) Assignee: Wichita State University, Wichita, KS (US)

( * ) Notice: Subject to any disclaimer, the term of this patent is extended or adjusted under 35 U.S.C. 154(b) by 90 days.

(21) Appl. No.: 16/013,114

(22) Filed: Jun. 20, 2018

(65) Prior Publication Data
US 2019/0226266 A1    Jul. 25, 2019

Related U.S. Application Data

(60) Provisional application No. 62/523,332, filed on Jun. 22, 2017.

(51) Int. Cl.
| | |
|---|---|
| *E05F 15/76* | (2015.01) |
| *E05F 15/77* | (2015.01) |
| *H04N 17/00* | (2006.01) |
| *E05F 15/73* | (2015.01) |

(52) U.S. Cl.
CPC ............ *E05F 15/76* (2015.01); *E05F 15/77* (2015.01); *H04N 17/004* (2013.01); *E05F 2015/767* (2015.01); *E05Y 2900/106* (2013.01)

(58) Field of Classification Search
CPC ..... E05F 15/76; E05F 15/77; E05F 2015/767; H04N 17/004; E05Y 2900/106
USPC ........................................................ 348/156
See application file for complete search history.

(56) References Cited

U.S. PATENT DOCUMENTS

| | | | |
|---|---|---|---|
| 7,224,275 B2 | 5/2007 | Fitzgibbon | |
| 7,635,966 B2 | 12/2009 | Butler | |
| 2001/0045327 A1* | 11/2001 | Shemanske, II | ....... H04N 7/188 187/317 |
| 2013/0031611 A1* | 1/2013 | Barreto | .................. G06Q 10/06 726/4 |

(Continued)

*Primary Examiner* — William C Vaughn, Jr.
*Assistant Examiner* — Jae N Noh
(74) *Attorney, Agent, or Firm* — Stinson LLP

(57) ABSTRACT

A remote control door closure operating system is based on a central server with a backend database identifying a collection of controllable doors and a plurality of authorized users and corresponding credentials. A door interface unit is adapted to communicate with an authorized user to supply a live video stream of a respective door and to execute door opening and closing commands from the authorized user. A mobile device has a user application program configured to interact with the central server and door interface unit in order to 1) obtain configuration data, 2) authenticate the authorized user, 3) receive the live video stream, and 4) initiate the door opening and closing commands. Safe operation of the door opening/closing operation is encouraged by maximizing use of video surveillance before and during door operations and by conducting separate security authentications for video streaming and for door operation requests.

18 Claims, 6 Drawing Sheets

(56) References Cited

U.S. PATENT DOCUMENTS

2016/0253855 A1\* 9/2016 Lowder ............ H04M 1/72533
 455/420

\* cited by examiner

INTERNET-BASED REMOTE CONTROL AND MONITORING SYSTEM FOR COMMERCIAL DOORS USING MOBILE DEVICES

CROSS REFERENCE TO RELATED APPLICATIONS

This application claims the benefit of U.S. provisional application Ser. No. 62/523,332, filed Jun. 22, 2017, which is incorporated herein by reference.

STATEMENT REGARDING FEDERALLY SPONSORED RESEARCH

Not Applicable.

BACKGROUND OF THE INVENTION

The present invention relates in general to remote control of large industrial/commercial doors such as hydraulic doors, and, more specifically, to a remote control door security system with a reduced reliance on specialized equipment while expanding system features and flexibility.

The ability to remotely control a commercial door unit is typically provided by a dedicated remote control. In some cases, local control may also be available via a panel mounted near the door. Such systems allow for controlling (e.g., opening and closing) the door unit from short distances while a user is on-site and actively utilizing the door. However, when the user is not close to the door installation (e.g., on vacation or otherwise physically absent from the area) but desires to remotely open, close, or monitor the door, then the switch panel or short-distance remote control are not adequate.

Existing products for controlling and monitoring powered garage-type doors from remote locations are typically based on Wi-Fi communication. In such remote control systems for commercial doors, just the mobile remote devices carried by the users are quite expensive (e.g., about $300 for each remote, per door) because they are specially-designed units dedicated to work only in one particular system. In the case of even a moderately sized business, several of these remotes are often needed for their employees, which makes the cost significantly higher. Furthermore, the security and monitoring features of existing devices have been limited.

SUMMARY OF THE INVENTION

It would thus be desirable to provide means for enabling the user to control the door unit without using a mounted door panel or dedicated remote control devices. Thus, the invention provides a mobile application that enables the user to control and monitor his or her door unit from any distance. The user can monitor the door status by looking at live streaming video of the door in the mobile application. This is particularly useful for giant commercial "lift" doors. Using motion sensors or load sensors is typically not effective for such doors because they do not reliably prevent the door from hitting and damaging objects in the door's path (e.g., cattle or expensive machinery). The live streaming video of the invention provides feedback such as indicating the position of the door prior to and/or after remotely commanding the door unit to open or close. Users are enabled to securely manage multiple doors from one user application ("app") loaded on a mobile device, and can provide them with a log including the history of each door's status. In addition, the invention is easily scalable so that an unlimited number of users could control and monitor many doors on their mobile devices using the same app.

The invention can provide various reports, which can be useful for managers. This invention can also be used with many different types of doors such as, garage doors, house doors, warehouse doors, airplane hangar doors, and others. The location where the door system is installed, as well as the location from which a user establishes a control link, can be anywhere that either a Wi-Fi network or a cellular (e.g., LTE) network are available.

In one primary aspect of the invention, a remote control door closure operating system comprises a door controller unit adapted to connect to a door actuator for operating the door closure and to a video camera for obtaining a view of the door closure. A central server and the door controller unit are adapted for network communication with each other and with a mobile device executing a user application, wherein the central server responds to a user of the mobile device to authenticate the user. When the user is validly authenticated then the central server is configured to enable access for the user application to a video stream from the door controller unit by opening a port in a network firewall operating in the door controller unit. The central server identifies the opened port to the user application. The door controller unit is configured to receive a request from the user of the user application for initiating a door operation. The door controller unit is configured to contact the central server to authenticate validity of the request based on an identity of the user before initiating the door operation.

DETAILED DESCRIPTION OF PREFERRED EMBODIMENTS

This invention may include a mobile application that enables remote control and real-time camera monitoring of commercial doors (e.g., big hydraulic doors, lift doors, warehouse doors) from a mobile device such as a cell phone or tablet over the Internet from anywhere which provides access to a central server (with an integrated or separate backend database) and a door controller unit at each controlled door closure. The mobile app is universal and could be seamlessly used on any Android, iPhone, or Windows mobile devices. The backend database may provide online management panel (i.e., dashboard) for clients wherein multiple doors are to be controlled and monitored, and provides report logs for managers in charge. The system can handle as many cameras per door as needed for monitoring. It also includes security features for the users and managers, and employs a secure communication protocol to carry out these operations.

Figure 1:
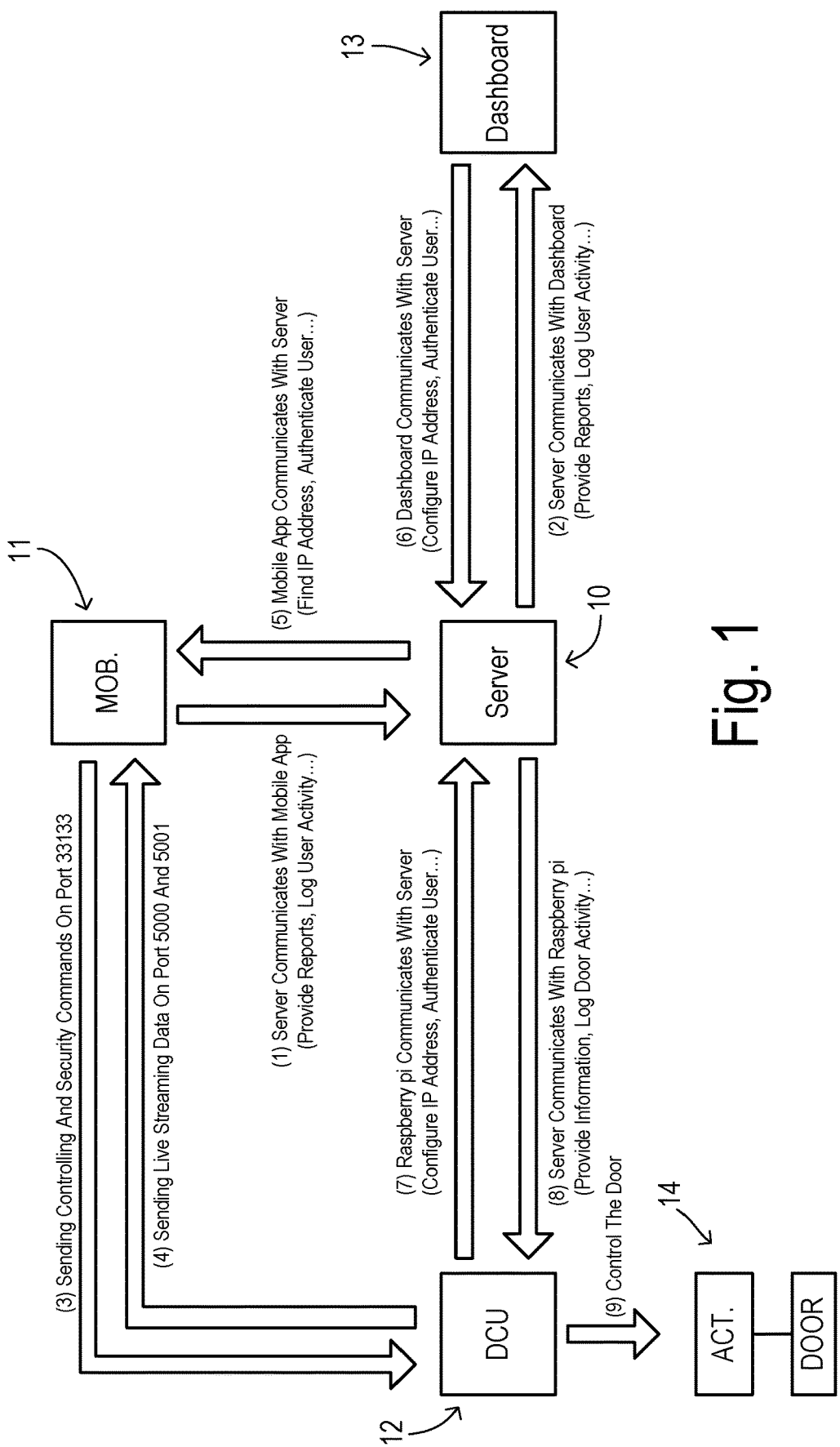
FIG. 1 is a block diagram showing the main elements of a system of the present invention.

As shown in FIG. 1, a main central server 10 communicates with a mobile device 11, a door controller or interface unit 12, and a dashboard control computer 13 containing a backend database. The communication links can use any available network protocols or systems (e.g., Ethernet, Internet Protocol) that support the interactions described below. Door controller unit 12 may be directly connected to a door actuation system 14 which includes a movable door closure and a door actuator (e.g., an electric motor drive system or a hydraulic actuator with an electrically driven hydraulic pump).

Figure 2:
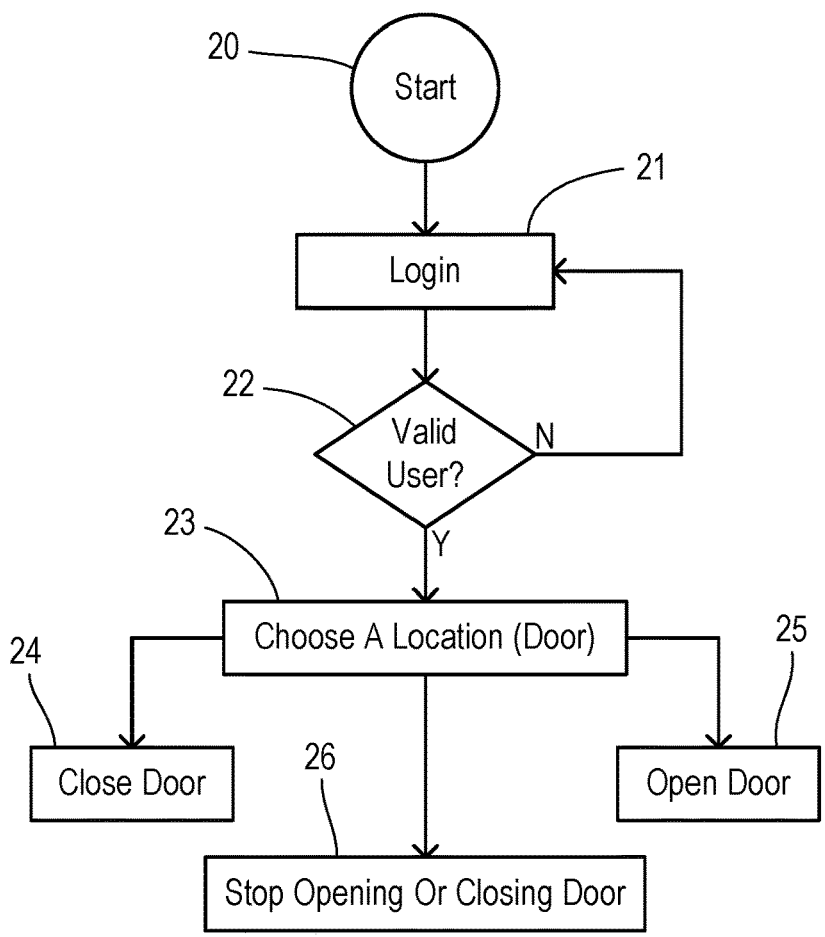
FIG. 2 is a flowchart showing a user procedure for controlling a door.

In a general method of the invention shown in FIG. 2, a user launches a designated app on their smart device in step 20. The central server is contacted and the user enters credentials for logging in. The server checks for a valid login in step 22. If not valid, then a return is made to step 21 to re-attempt a login. If valid, then the central server retrieves configuration data for the user and presents a list of authorized door locations for selection by the user. When a location is selected, the microcontroller begins to live stream a video feed from the chosen location to the users device. After inspecting the situation at the door site, the user can initiate closing of the door in step 24, opening of the door in step 25, or halting a pending opening or closing operation in step 26. The user is able to watch the live stream video at all times during this operation.

Returning to FIG. 1, central server 10 monitors the communication security and also manages activity logs and reports as shown at Arrow (1) and Arrow (2). A backend database for the system resides on or is accessible to server 10 and/or dashboard 13, and can be constructed using MySQL, for example. For a mobile application on mobile device 11, the Cordova platform can preferably be used. For developing the online management panel, PHP can be used as the programming language.

For connections between a microcontroller in door controller unit 12 and the mobile application, socket programming can be used as shown at Arrow (3) and Arrow (4). In one embodiment, the controlling commands are sent on port 33133 (Arrow (3)). The live streaming data from a video camera is transmitted to port 5000 and port 5001 (Arrow (4)). The transmission protocols can include security commands that make communication between microcontroller and mobile application much safer. The door interface microcontroller, the mobile application, and the dashboard have access to the integrated MySQL database (Arrows (5), (6), and (7)). The microcontroller, mobile application, and dashboard computer use these data for several purposes such as, configuring the door controller unit's IP address for the first time, authenticating users, and providing useful reports for users and managers (Arrow (5) and Arrow (8)). In a preferred embodiment, the microcontroller unit uses Python code for handling Raspberry Pi operations, and has an output coupled to the actuation system (e.g., a relay control switch) to open or close the door (Arrow (9)).

Figure 3:
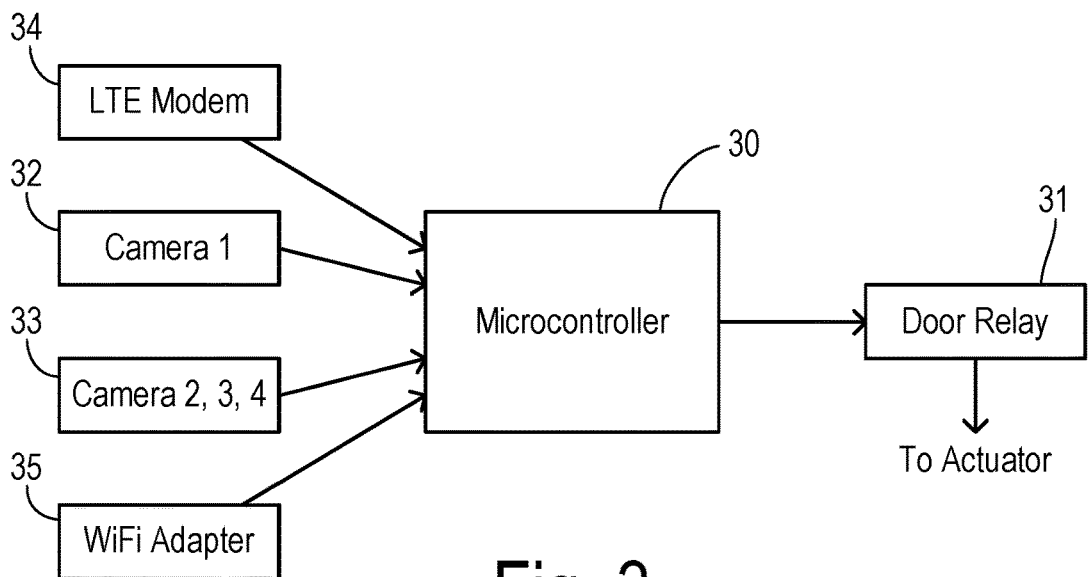
FIG. 3 is a block diagram showing one embodiment of a door controller unit implementing the invention at a site of a door.

FIG. 3 shows one embodiment of a door interface unit in greater detail. A microcontroller 30 may be comprised of an electronics module incorporating a Raspberry Pi design with peripherals. An output of microcontroller 30 is connected to a door relay 31 which in turn controls an electric or hydraulic door opener. Peripherals include cameras 32 and 33 (e.g., 4 or more day/night, all weather cameras) for providing the video stream presenting suitable views of the door closure and surroundings. An LTE modem 34 and a WiFi adapter 35 are selectably used in order to establish communication with the central server and the mobile application.

Figure 4:
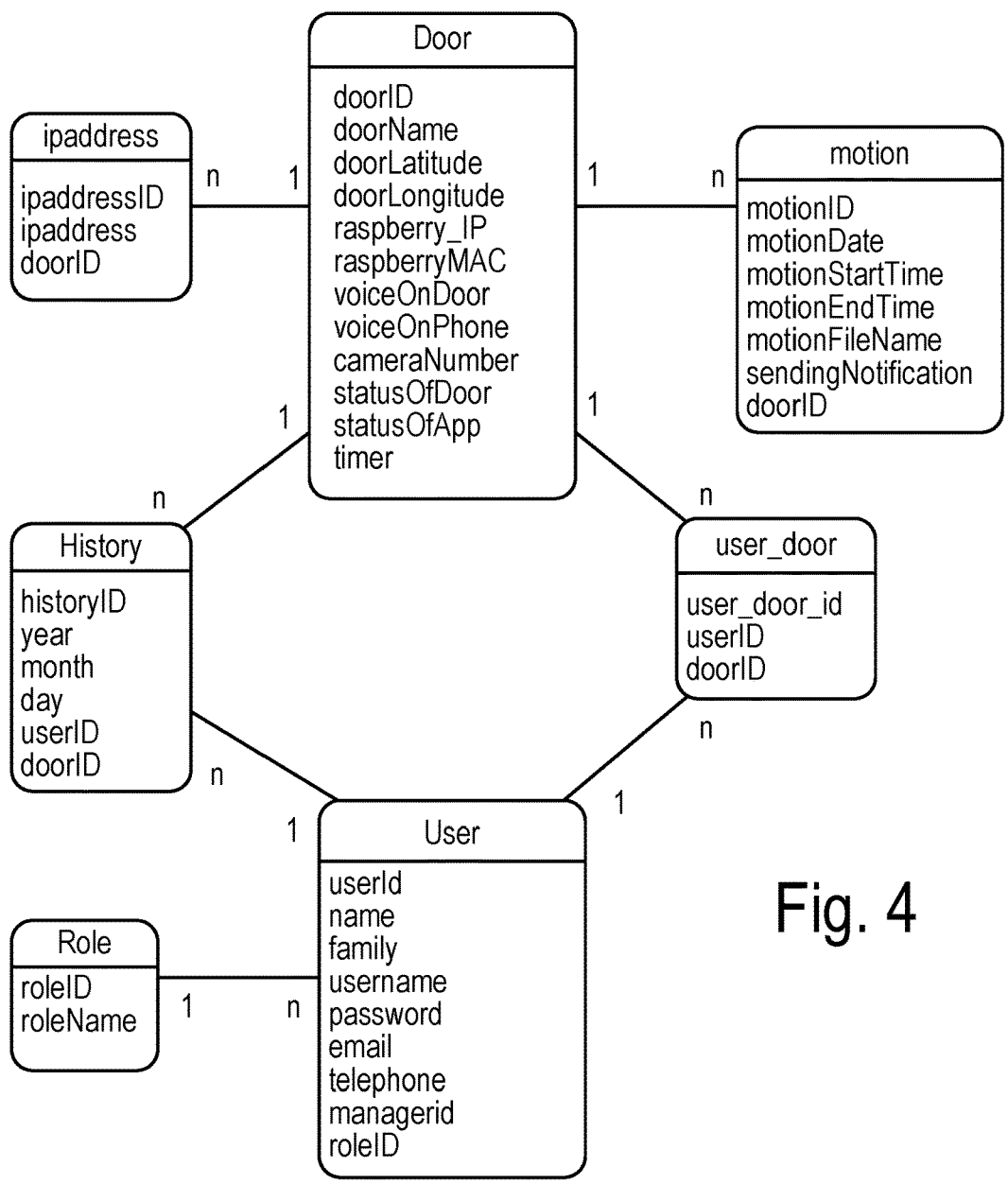
FIG. 4 is an entity relationship diagram showing a database structure according to one embodiment of the invention.

The tables of the backend database are explained in the ERD of FIG. 4. There are seven different tables. Each table has several columns which define different features of users and doors such as username and password related to each door, location of the door, IP address of the microcontroller connected to the door, and a count of each door's opening and closing.

In addition to the above features, the door interface unit could detect suspicious movements through the cameras and then send alerts to a designated user. If the detected motion persists for longer than a certain period of time (e.g., 30 seconds) then the video stream may preferably be recorded by the door controller unit. Fire, smoke, carbon-monoxide, and other types of hazard detectors could be connected to the microcontroller, and any corresponding alerts would be sent to the user. An audio system (i.e., speaker and microphone) could be installed on the door and connected to the microcontroller. The user could then not only see, but also talk and listen to an individual at the door through the mobile app. User identification through "fingerprinting" at the mobile device could be included in the app for accessing some or all features.

By configuring the "Roles" for particular users in the tables, different levels of authorization could be provided for different users. For example, a user could be given permission to access video only, or permission to open/close doors only during restricted hours (e.g., time of the day and/or days of the week).

Figure 5:
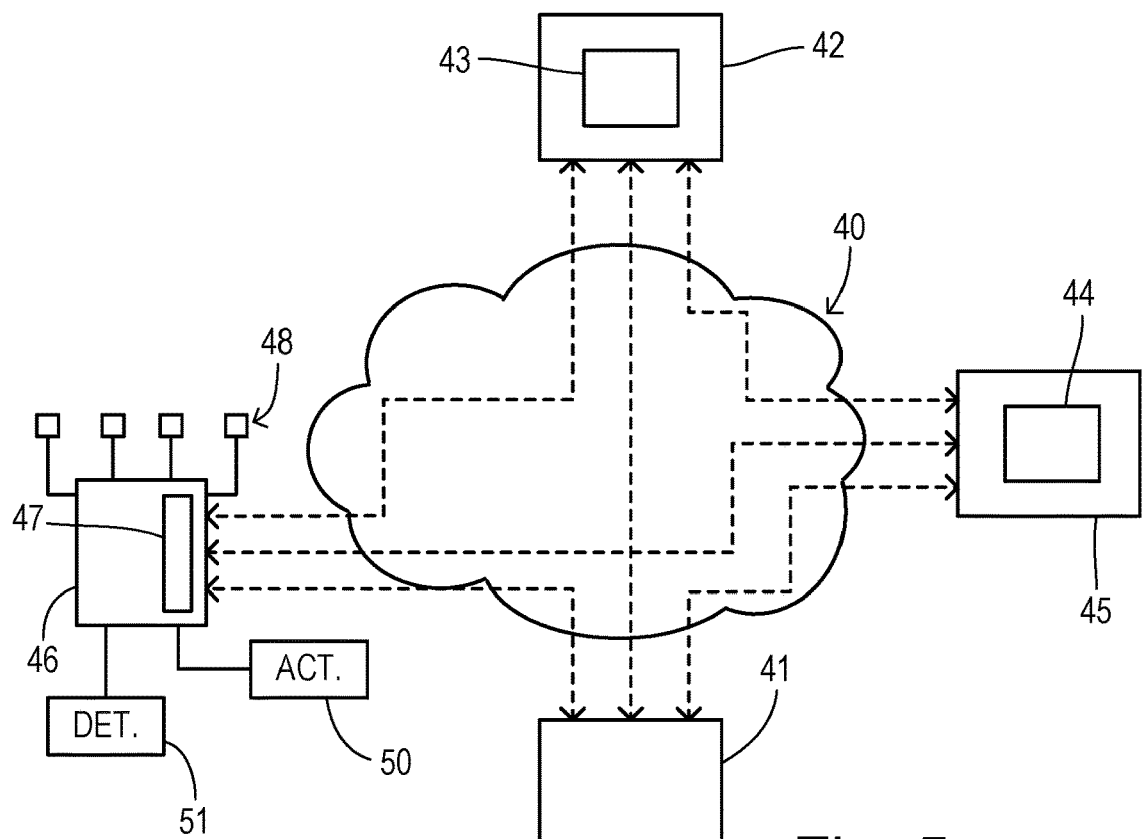
FIG. 5 is a block diagram showing another embodiment of a system for practicing the invention.

As shown in FIG. 5, various components of the invention communicate via a network cloud 40 which may include the Internet together with various wired and wireless access technologies as known in the art. A central server 41 is adapted for network communication with a mobile device 42 executing a user application 43, a backend database 44 residing in a dashboard system 45, and a door controller unit 46. Door controller unit 46 contains a firewall 47 for restricting access to a video stream generated using a plurality of cameras 48 and other features of door controller unit 46 such as door operating commands which can be issued to a door actuator 50. Door controller unit 46 is connected to actuator 50 and to a detector 51 for monitoring door movement and the position of the door closure. Although dashboard system 45 and backend database 44 are shown at a separate network location, they can be co-located with server 41 if desired.

Figure 6:
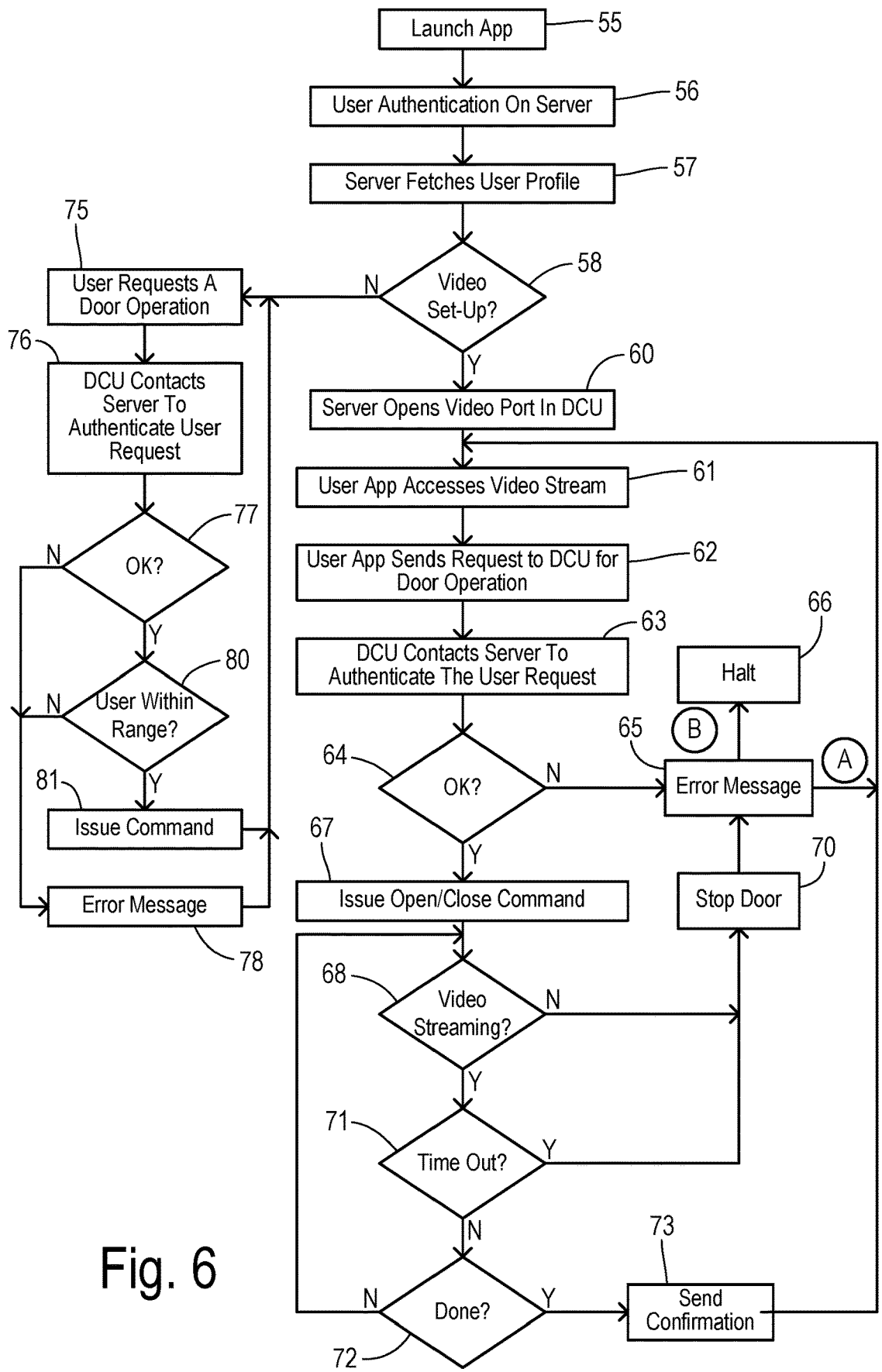
FIG. 6 is a flowchart showing a method of the invention in greater detail.

FIG. 6 shows a preferred method of the invention using the system architecture shown in FIG. 5. In step 55, a user launches a user application on their mobile device for the purpose of monitoring and/or controlling a door closure. Based on credentials that are set up in advance by a manager using the dashboard system or mobile application to create user IDs and passwords, the user is authenticated by the server in step 56. Based on authentication information provided by the user, the central server fetches a user profile in step 57. In the event that a particular user has remote access to multiple door closures, user application may present a menu identifying all the door closures to allow the user to select a desired closure.

In step 58, the central server verifies whether a selected door closure has an associated video feed. An assumption of a preferred embodiment of the invention is that remote control access for opening or closing a door should only be performed when the remote user is able to visually monitor the door closure. Nevertheless, when certain conditions are present, the invention may allow door control without a video stream as described later. When video is present, then the server opens a port in the firewall of door controller unit in step 60. The opening of the port is obtained as a result of an ability of the central server to exert control over the door controller unit via direct communication between them. The port information is shared by the central server with the user application allowing the authenticated user to obtain a video stream while preventing others from remotely monitoring the video stream.

In step 61, the user application accesses the video stream by utilizing the information obtained from the central server. As the user monitors the video stream and a decision is made to open or close the door, the user manipulates the user application to send a request to the door controller unit for the desired door operation (e.g., to open or close the door). In order to maintain maximum security, before executing a requested door operation the door controller unit contacts the central server in step 63 to individually authenticate each user request. The re-authentication may include both a re-validation of the ID and password credentials of the user as well as a verification of the permissions granted to the particular user. For example, the user may have stored permissions providing limitations with respect to the times of day or the days of the week when access to a respective door operation is granted. A check is performed in step 64 to determine whether the user identity and nature of the requested door operation are valid. If not, then an error message may be sent from the central server to the door controller unit and/or the user application. Depending upon the nature of the validation failure or other conditions, the method may proceed along a branch B to halt a user session in step 66 to prevent further attempts by the user to monitor or control the door closure. Alternatively, a return may be made along a branch A to step 61 to continue providing access to the video stream.

Upon successful re-authentication/validation in step 64, the door controller unit may initiate an open or close command in step 67 corresponding to the user's request. A check is performed in step 68 to determine whether video streaming access is being maintained. If not, then the door actuation may be immediately stopped in step 70 to prevent door operation which cannot be visually monitored by the user. If the video streaming continues, a check is made in step 71 to determine whether an elapsed time since beginning the door operation has expired. For example, a door may become stuck in an intermediate position or a door monitoring sensor may have failed. To prevent possible damage to a door actuator from continuous application of power, the execution of a door operation is stopped in step 70 if the elapsed time for executing the door operation exceeds a predetermined threshold. If a timeout has not occurred, then a check is performed in step 72 to determine whether the door operation has successfully completed. If not, then a return is made to step 68. Upon successful completion, a confirmation message may be sent in step 73 from the door controller unit to the user application and/or the central server for logging of door events. Then a return is made to step 61 to continue monitoring the video stream.

In cases where video cameras are not utilized or have failed as detected in step 58, then door operation may still be possible if the user can otherwise obtain visual monitoring of the door as a result of a close proximity to the door. In step 75, an authenticated user who is not receiving a video stream may request a door operation. The door controller unit contacts the server to authenticate the user request in step 76. If the user is not authenticated in step 77, then an error message is sent in step 78. If the user successfully authenticates, then a check is performed in step 80 to determine whether the user is within a predetermined range (e.g., distance) of the door closure. If the user can be placed within the predetermined range, then it is assumed that visual monitoring of the door is being performed in person. The distance between the user's mobile device and the door closure may be determined using a location function normally implemented in mobile device as known in the art. The location is shared with the door control unit and/or central server which calculates the distance. Alternatively, a geographic area can be defined, and the user's location compared to the defined area. When the user is within the proper range or location, then a door open or closing command can be issued in step 81.

The invention provides for a direct network connection between the door controller unit and the user application. Due to the nature of network communications, an Internet connection may be sometimes lost even though the other direct connections are maintained by the door controller unit and user application with the central server and/or the backend database. Although the video stream would most likely also be disrupted in the event of loss of direct communication, detection may be delayed. In order to more robustly avoid discrepancies between the actual state of the door closure and the perceived state as determined at the user application, the present invention may utilize a status checking process as described in FIGS. 7-9.

Figure 7:
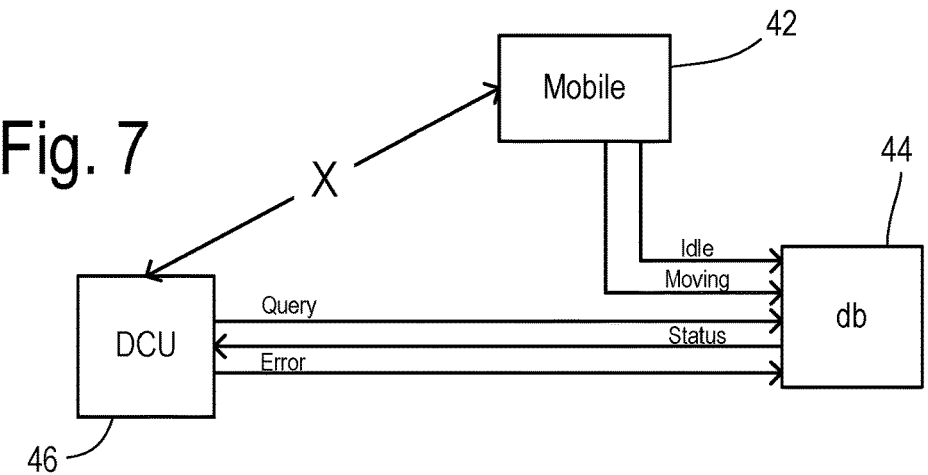
FIG. 7 is a block diagram showing network communications between components of the invention relating to a cross checking function during execution of a door operation (opening or closing event).

FIG. 7 shows the potential loss of direct connection between mobile device 42 and door control unit 46. Via an ongoing connection with backend database 44 (e.g., via the central server), various messages are exchanged in order to compare the actual and perceived door states. When the user application executing on mobile device 42 determines that the door closure is in an idle status, then it periodically sends a corresponding Idle Message to database 44 (e.g., every 5 seconds). When mobile device 42 detects that the door closure is moving, it periodically sends a Moving Message at a higher repetition rate (e.g., every 2 seconds). FIG. 7 further shows a Query Message sent by door controller unit 46 (e.g., every 2 seconds) while the door is moving in order to compare with the perceived status of the user application. Database 44 responds with a Status Message according to the most recent message received from mobile unit device 42 (i.e., whether it was an Idle Message or a Moving Message). In the event of an error, door controller unit 46 sends an Error Message to database 44, and halts execution of the door's operation.

Figure 8:
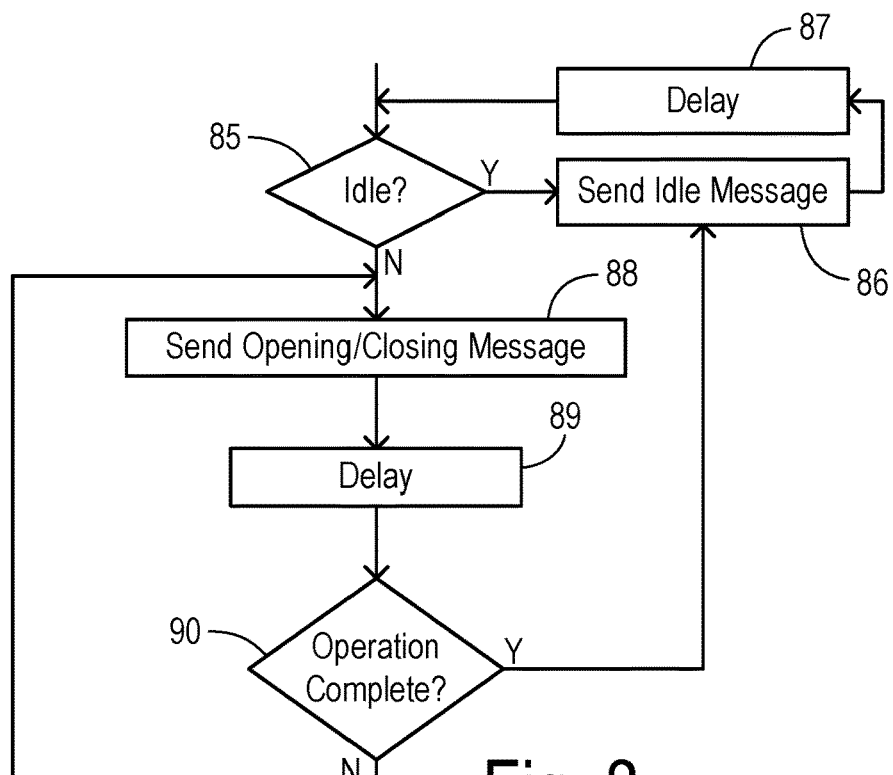
FIG. 8 is a flowchart showing a method performed in the mobile device in connection with the cross checking function.

FIG. 8 shows a portion of the process performed in the mobile device. A check is performed in step 85 to determine whether the door closure is expected to be idle. If so, then an Idle Message is sent to the database in step 86. After a predetermined delay in block 87, another check is performed in step 85. When the door is no longer expected to be idle (i.e., an opening or closing request was sent and accepted), then a Moving Message is sent in step 88. After another predetermined delay in step 89, the user application performs a check in step 90 to determine whether the operation is complete. If not, then a return is made to step 88 to send another (opening or closing) Moving Message. If operation is complete, then an Idle Message is sent in step 86.

Figure 9:
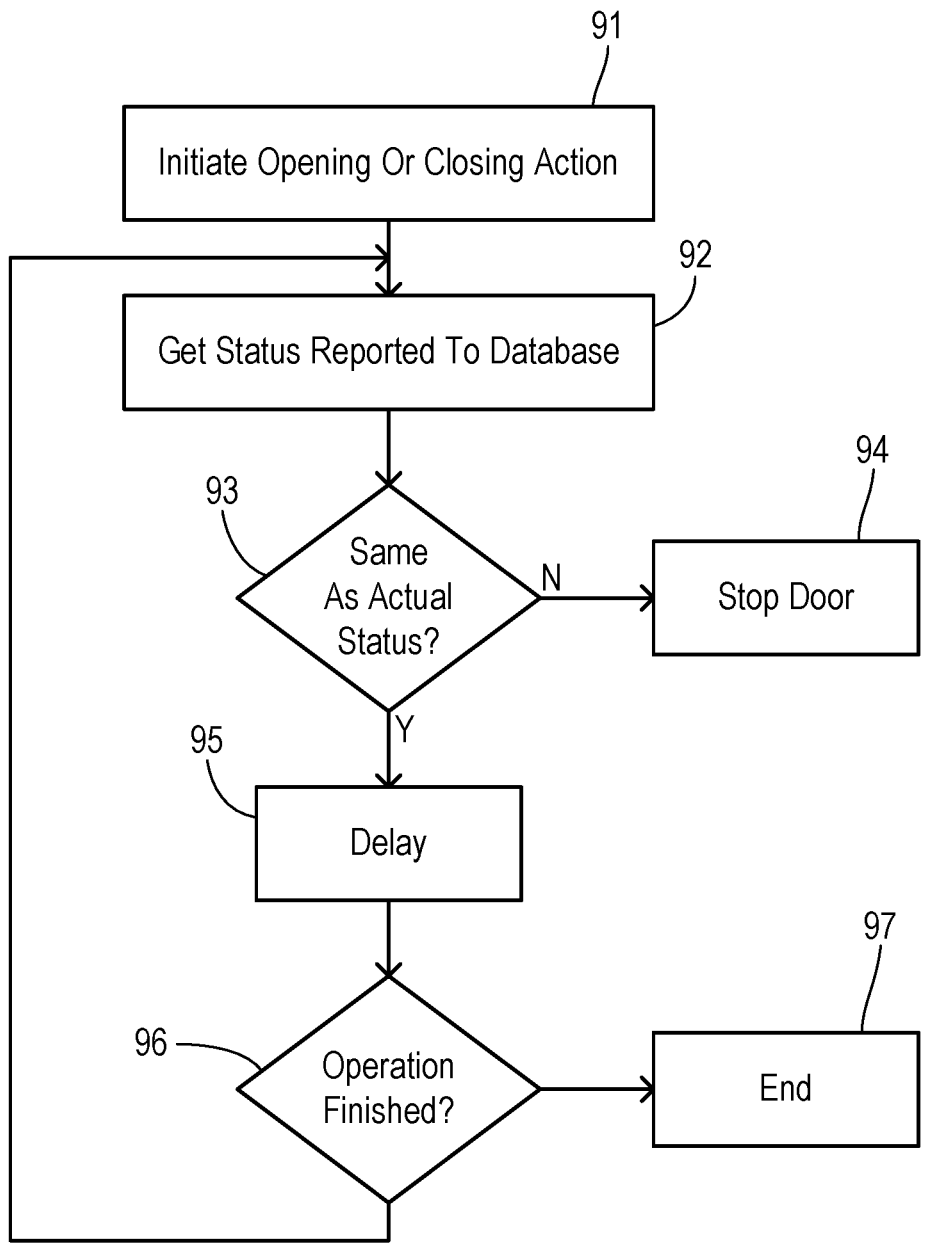
FIG. 9 is a flowchart showing a method performed in the door controller unit in connection with the cross checking function.

FIG. 9 shows a portion of the process occurring in the door controller unit. In step 91, an opening or closing action is initiated. As the door closure moves, the door controller unit obtains the most recent status reported to the backend database by the user application in step 92 by sending a Query Message. In step 93, the reported status is compared with the actual status. If the reported and actual status do not match, then door movement is stopped in step 94. If the statuses match, then after a delay in block 95 a check is performed in step 96 to determine whether the door operation is finished. If not, then a return is made to step 92 for further queries to the database. Once the door operation is finished, the process ends at step 97.

What is claimed is:

1. A remote control door closure operating system comprising:
    a door controller unit adapted to connect to a door actuator for operating the door closure and to a video camera for obtaining a view of the door closure; and
    a central server, wherein the central server and the door controller unit are adapted for network communication with each other and with a mobile device operating a user application, wherein the central server responds to a user of the mobile device to authenticate the user, and wherein when the user is validly authenticated then the central server is configured to enable access for the user application to a video stream from the door controller unit by opening a port in a network firewall operating in the door controller unit and configured to identify the opened port to the user application;
    wherein the door controller unit is configured to receive a request from the user of the user application for initiating a door operation, and wherein the door controller unit is configured to contact the central server to authenticate validity of the request based on an identity of the user before initiating the door operation.

2. The system of claim 1 wherein the door controller unit monitors transmission of the video stream during execution of the door operation, and wherein the door controller unit halts execution of the door operation in the event of detecting that transmission of the video stream has failed.

3. The system of claim 1 wherein the door controller unit monitors an elapsed time during execution of the door operation, and wherein the door controller unit halts execution of the door operation in the event that the elapsed time exceeds a predetermined threshold.

4. The system of claim 1 further comprising a backend database configured to identify a collection of controllable doors and a plurality of authorized users and corresponding credentials, wherein the validity of the request depends on stored permissions of the identified user for opening and closing the door closure.

5. The system of claim 4 wherein the stored permissions of the identified user include times of day or days of the week when access to respective door operations is authorized.

6. The system of claim 4 wherein the backend database resides within the central server.

7. The system of claim 1 further comprising a backend database configured to identify a collection of controllable doors and a plurality of authorized users and corresponding credentials, wherein the central server is configured to receive idle messages from the user application when a request for a door operation is not initiated by the user, wherein the central server is configured to receive operating messages from the user application when the user application determines that a request initiated by the user is in progress, wherein a request status is stored in the backend database according to the idle messages and the operating messages, wherein the door controller unit retrieves the stored request status from the backend database when it executes a requested door operation, and wherein the door controller unit halts an executing door operation if the stored request status fails to match an actual status.

8. The system of claim 1 wherein the door controller unit has a non-video mode, wherein when receiving a request from the user for initiating a door operation and the request is validated by the central server then the door controller unit determines a proximity between the mobile device and the door closure, and wherein the door controller module initiates the requested door operation only if the proximity is within a predetermined proximity threshold.

9. The system of claim 8 wherein the predetermined proximity threshold is a distance.

10. A method of remote monitoring and operation of a door closure, comprising the steps of:
    configuring a backend database containing address data of a plurality of door controller units each associated with a respective door closure, a plurality of authorized users of respective doors, and corresponding user credentials and permissions;
    launching a user application on a mobile device of a user;
    conducting network communication between the user application and a central server to authenticate the user, wherein the central server accesses the backend database to obtain the corresponding user credentials;
    conducting network communication between the central server and the door controller unit to open a video port in a network firewall operating in the door controller unit;
    conducting network communication between the central server and the mobile device to identify the opened video port to the user application;
    capturing video data showing the door closure from a video camera connected to the door controller unit;
    streaming the video data via the opened video port to the mobile device for presentation to the user;
    conducting network communication between the user application on the mobile device and the door controller unit to transmit a request from the user for initiating a door operation;
    conducting network communication between the door controller unit and the central server to authenticate validity of the request based on an identity of the user; and
    initiating the door operation if validity of the request is authenticated.

11. The method of claim 10 further comprising the steps of:
    monitoring transmission of the video stream during execution of the door operation; and
    halting execution of the door operation in the event of detecting that transmission of the video stream has failed.

12. The method of claim 10 further comprising the steps of:
    monitoring an elapsed time during execution of the door operation; and
    halting execution of the door operation in the event that the elapsed time exceeds a predetermined threshold.

13. The method of claim 10 wherein the validity of the request depends on stored permissions of the identified user for opening and closing the door closure.

14. The method of claim 13 wherein the stored permissions of the identified user include times of day or days of the week when access to respective door operations is authorized.

15. The method of claim 10 wherein the backend database resides within the central server.

16. The method of claim 10 further comprising the steps of:
- transmitting idle messages from the user application to the central server when a request for a door operation is not initiated by the user;
- transmitting operating messages from the user application to the central server when the user application determines that a request initiated by the user is in progress;
- storing a request status in the backend database according to the idle messages and the operating messages;
- the door controller unit retrieving the stored request status from the backend database when it executes a requested door operation; and
- halting an executing door operation if the stored request status fails to match an actual status.

17. The method of claim 10 with a non-video mode, comprising the steps of:
- determining a proximity between the mobile device and the door closure when a request from the user for initiating a door operation is validated by the central server; and
- initiating the requested door operation only if the proximity is within a predetermined proximity threshold.

18. The method of claim 17 wherein the predetermined proximity threshold is comprised of a distance.

* * * * *